United States Patent
Chhabra et al.

(10) Patent No.: US 10,719,854 B2
(45) Date of Patent: Jul. 21, 2020

(54) METHOD AND SYSTEM FOR PREDICTING FUTURE ACTIVITIES OF USER ON SOCIAL MEDIA PLATFORMS

(71) Applicant: CONDUENT BUSINESS SERVICES, LLC., Florham Park, NJ (US)

(72) Inventors: Shruti Chhabra, Ghaziabad (IN); Shourya Roy, Bangalore (IN); Ragunathan Mariappan, Chennai (IN)

(73) Assignee: CONDUENT BUSINESS SERVICES, LLC., Florham Park, NJ (US)

( * ) Notice: Subject to any disclaimer, the term of this patent is extended or adjusted under 35 U.S.C. 154(b) by 777 days.

(21) Appl. No.: 15/014,140

(22) Filed: Feb. 3, 2016

(65) Prior Publication Data
US 2017/0220926 A1    Aug. 3, 2017

(51) Int. Cl.
*G06Q 30/02* (2012.01)
*G06Q 50/00* (2012.01)
(Continued)

(52) U.S. Cl.
CPC ......... *G06Q 30/0269* (2013.01); *G06N 7/005* (2013.01); *G06N 20/00* (2019.01); *G06Q 50/01* (2013.01)

(58) Field of Classification Search
CPC .... G06Q 50/01; G06N 30/0269; G06N 20/00; G06N 7/005
See application file for complete search history.

(56) References Cited

U.S. PATENT DOCUMENTS

| 2003/0065409 A1* | 4/2003 | Raeth ............... G05B 9/02 700/31 |
| 2007/0055477 A1 | 3/2007 | Chickering et al. |

(Continued)

FOREIGN PATENT DOCUMENTS

WO    WO 2014/028648 A2    2/2014

OTHER PUBLICATIONS

Xu, Zhiheng, et al. "Modeling user posting behavior on social media." Proceedings of the 35th international ACM SIGIR conference on Research and development in information retrieval. ACM, 2012. (Year: 2012).*

(Continued)

*Primary Examiner* — Li B. Zhen
*Assistant Examiner* — Markus A. Vasquez
(74) *Attorney, Agent, or Firm* — Jones Robb, PLLC

(57) ABSTRACT

The disclosed embodiments illustrate a method and a system for predicting future activities of a user on a social media platform. The method includes extracting a first time series of one or more historical activities performed by the user from a social media platform server. The method further includes receiving a second time series of one or more future events from a requestor-computing device. The method further includes determining a first set of forecast values and a second set of forecast values based on the first time series and/or the second time series, wherein the first set of forecast values is determined using an ARIMA technique, and the second set of forecast values is determined using a regression modelling technique. The method further includes predicting the future activities of the user based on the first set of forecast values and the second set of forecast values.

20 Claims, 4 Drawing Sheets

(51) Int. Cl.
*G06N 7/00* (2006.01)
*G06N 20/00* (2019.01)

(56) References Cited

U.S. PATENT DOCUMENTS

| | | |
|---|---|---|
| 2011/0225043 A1 | 9/2011 | Bhatia et al. |
| 2012/0226645 A1 | 9/2012 | O'Rourke |
| 2013/0275352 A1 | 10/2013 | Servi et al. |
| 2014/0280621 A1 | 9/2014 | Bourdaillet et al. |
| 2015/0134413 A1* | 5/2015 | Deshpande ........ G06Q 30/0202 705/7.31 |
| 2015/0302315 A1* | 10/2015 | Ahn ........................ G06N 5/04 706/46 |

OTHER PUBLICATIONS

Zhu, Yin, et al. "Predicting user activity level in social networks." Proceedings of the 22nd ACM international conference on Information & Knowledge Management. ACM, 2013. (Year: 2013).*

* cited by examiner

METHOD AND SYSTEM FOR PREDICTING FUTURE ACTIVITIES OF USER ON SOCIAL MEDIA PLATFORMS

TECHNICAL FIELD

The presently disclosed embodiments are related, in general, to data mining. More particularly, the presently disclosed embodiments are related to a method and a system for predicting future activities of a user on social media platforms.

BACKGROUND

With proliferation of electronic devices, such as laptops, smartphones, tablets, and/or the like, along with ever-increasing advancements and popularity of social media platforms such as FACEBOOK, LINKEDIN, TWITTER™, and/or the like, human generated messages have grown at a speedy rate. Further, the social media platforms may have alleviated the users to post and/or share the messages that may be representative of their respective characteristics such as likes, dislikes, needs, thoughts, and sentiments. Such messages may be of significance to a business organization. For example, the business organization may determine preferences of the users towards products and services, and accordingly, the business organization may recommend the products and services. In another example, the business organization may alter their respective business strategy to target such users.

However, such characteristics of the users may not be static in nature may change with time. The characteristics of the users may deviate or change based on future events, such as festivals, sports, politics, and/or the like. In such scenarios, predicting future activities of the users may be a non-trivial task.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for predicting one or more future activities of a user on a social media platform. The method includes extracting, by one or more processors, a first time series of one or more historical activities performed by the user on the social media platform from a social media platform server. The method further includes receiving, by the one or more processors, a second time series of one or more future events from a computing device. The method further includes determining, by the one or more processors, a first set of forecast values pertaining to the one or more future activities based on the first time series, wherein the first set of forecast values is determined using a first forecasting technique. The first forecasting technique corresponds to an auto regressive integrated moving average (ARIMA) technique. The method further includes determining, by the one or more processors, a second set of forecast values pertaining to the one or more future activities based on the first time series and the second time series, wherein the second set of forecast values is determined using a second forecasting technique. The second forecasting technique corresponds to a regression modelling technique. The method further includes predicting, by the one or more processors, the one or more future activities of the user based on the first set of forecast values and the second set of forecast values. The one or more future activities may comprise one or more of a frequency of visit of the user to the social media platform during a second predefined time duration, a count of messages to be posted, shared, or followed by the user during the second predefined time duration, and a like or a dislike of the user towards a product or a service during the second predefined time duration.

According to embodiments illustrated herein, there is provided a system for predicting one or more future activities of a user on a social media platform. The system includes one or more processors configured to extract a first time series of one or more historical activities performed by the user on the social media platform from a social media platform server. The one or more processors are further configured to receive a second time series of one or more future events from a computing device. The one or more processors are further configured to determine a first set of forecast values pertaining to the one or more future activities based on the first time series, wherein the first set of forecast values is determined using a first forecasting technique. The first forecasting technique corresponds to an auto regressive integrated moving average (ARIMA) technique. The one or more processors are further configured to determine a second set of forecast values pertaining to the one or more future activities based on the first time series and the second time series, wherein the second set of forecast values is determined using a second forecasting technique. The second forecasting technique corresponds to a regression modelling technique. The one or more processors are further configured to predict the one or more future activities of the user based on the first set of forecast values and the second set of forecast values. The one or more future activities may comprise one or more of a frequency of visit of the user to the social media platform during a second predefined time duration, a count of messages to be posted, shared, or followed by the user during the second predefined time duration, and a like or a dislike of the user towards a product or a service during the second predefined time duration.

According to embodiments illustrated herein, there is provided a computer program product for use with a computing device. The computer program product comprises a non-transitory computer readable medium storing a computer program code for predicting one or more future activities of a user on a social media platform. The computer program code is executable by one or more processors in the computing device to extract a first time series of one or more historical activities performed by the user on the social media platform from a social media platform server. The computer program code is further executable by the one or more processors to receive a second time series of one or more future events from a computing device. The computer program code is further executable by the one or more processors to determine a first set of forecast values pertaining to the one or more future activities based on the first time series, wherein the first set of forecast values is determined using a first forecasting technique. The first forecasting technique corresponds to an auto regressive integrated moving average (ARIMA) technique. The computer program code is further executable by the one or more processors to determine a second set of forecast values pertaining to the one or more future activities based on the first time series and the second time series, wherein the second set of forecast values is determined using a second forecasting technique. The second forecasting technique corresponds to a regression modelling technique. The computer program code is further executable by the one or more processors to predict the one or more future activities of the user based on the first set of forecast values and the second set of forecast values. The one or more future activities may comprise one or more of a frequency of visit of the user to the social media platform during a second predefined time duration, a count of messages to be posted, shared, or followed by the user during the second predefined time duration, and a like or a dislike of the user towards a product or a service during the second predefined time duration.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
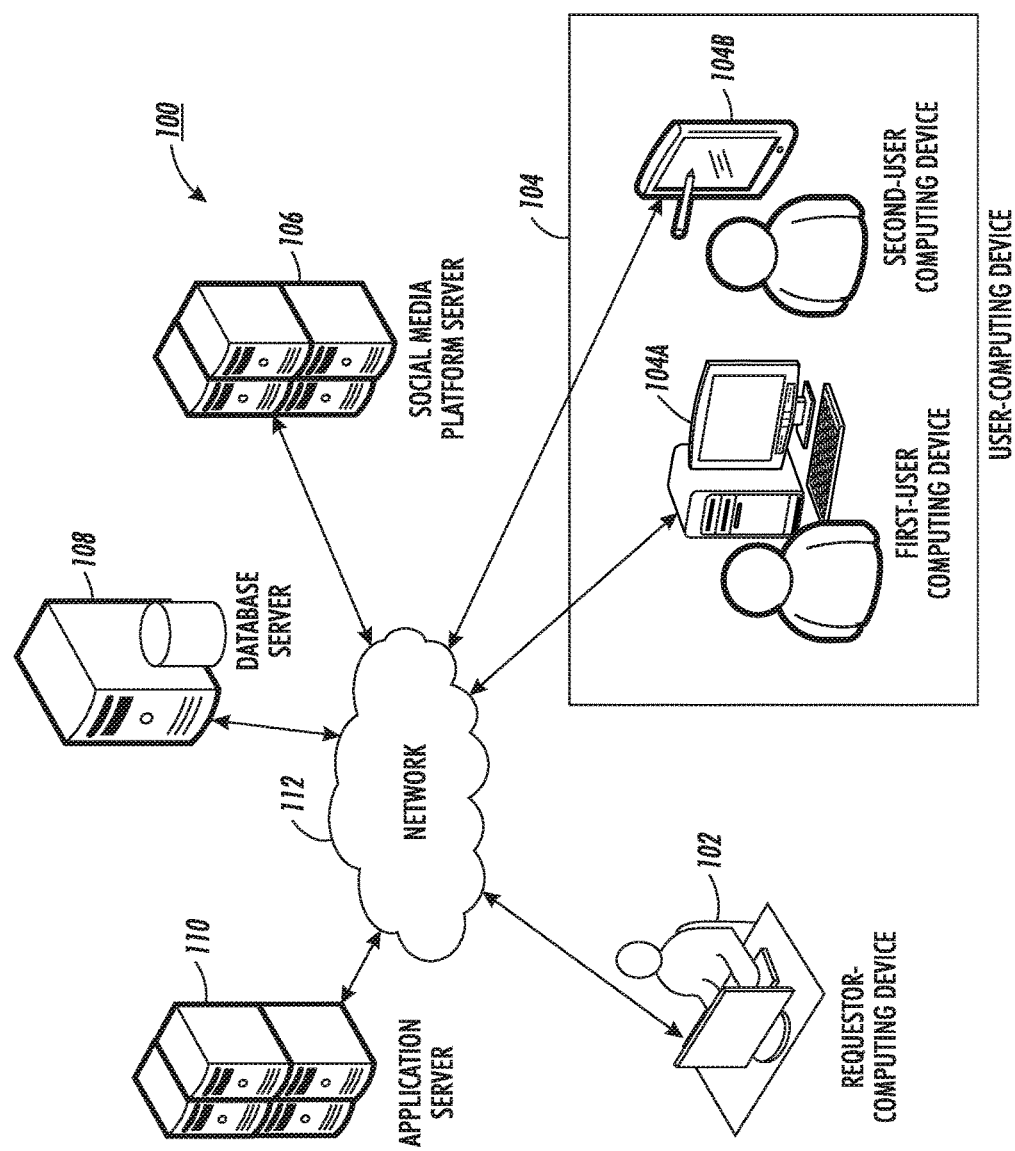
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes one or more processors/microcontrollers and/or any other electronic components, a device, or a system that performs one or more operations according to one or more programming instructions/codes. Examples of the computing device may include, but are not limited to, a desktop computer, a laptop, a PDA, a mobile device, a smartphone, a tablet computer (e.g., iPad® and Samsung Galaxy Tab®), and/or the like.

A "user" refers to an individual who may be registered on one or more social media platforms. The user may interact with one or more other users on the one or more social media platforms who are known to or otherwise acquainted with him/her, by performing one or more activities. For example, a user may share a message with one or more other users. In an embodiment, the one or more activities may include, but are not limited to, posting, liking, or disliking a message, sharing a message with the one or more other users, and/or the like.

A "message" refers to a written or recorded communication that may have been shared or posted by a user on a social medial platform. In an embodiment, the message may correspond to one or more of, but are not limited to, a text message, an image, an audio, a video, and/or the like.

A "social media platform" refers to a communication platform through which a user may interact with one or more other users who are known to or otherwise acquainted with the user. Further, apart from interacting with one another, the user and the one or more other users may perform one or more activities on the social media platform. In an embodiment, the one or more activities may include, but are not limited to, following the one or more other users, posting/sharing a message, and liking or disliking messages posted/shared by the other users. Examples of the social media platforms may include, but are not limited to, social networking websites (e.g., FACEBOOK, TWITTER™, LINKEDIN, GOOGLE+™, and so forth), web-blogs, web-forums, community portals, online communities, or online interest groups. Hereinafter, the term "social media platform" may be interchangeably referred as "social network platform", "social media websites", or "social networking platform".

"Social media data" refers to a historical data of a user, who is associated with a social media website, such as FACEBOOK. The social media data may include at least a log of one or more activities performed by the user on the social media platform. For example, the social media data may include a log of one or more messages posted, shared, liked, or disliked by the user on the social media website and a time stamp associated with each of the one or more messages. The social media data may further include one or more attributes of the user. For example, the one or more attributes of the user may include, but are not limited to, name, age, geographic location, likes, dislikes, hobbies, and so on.

"Future activities" refers to a set of activities or actions that may be performed by a user in future. For example, the future activities may include, but are not limited to, a frequency of visit to a social media platform during a future time duration by the user, a count of messages that may be posted, shared, or followed by the user during the future time duration, a like or a dislike of the user towards a product or a service during the future time duration, and/or the like.

A "requestor" refers to an individual, an advertiser, a sales person, or an entity such as an organization, a business group, or a franchise. In an embodiment, the requestor may be interested in forecasting or identifying future activities of a user on a social media platform. Further, in an embodiment, after identifying the one or more needs of the user, the requestor may suggest or propose or recommend one or more products or services to the user based on the predicted future activities of the user.

A "time series" refers to a temporal sequence of one or more activities performed by a user during a predefined time duration. In an embodiment, the time series may further comprise a count of the one or more activities performed by the user. For example, a user posted "10" messages in January, "12" messages in February, "7" messages in March, "18" messages in April, "14" messages in May, and "3" messages in June. In such a case, the time series for a count of messages posted by the user during January-June may be given as:

time series=[10, 12, 7, 18, 14, 3]

In an embodiment, the time series may correspond to a univariate time series or a multivariate time series. In an embodiment, the multivariate time series may include observations of a p-dimensional variable. For example, 'n' realizations of p-dimensional variable may constitute a multivariate time series. For example, a multivariate time series may include a count of one more activities of one or more users.

A "future event" refers to an event that may influence, inspire, or enhance one or more activities of a user on a social media platform. The one or more future events may comprise one or more periodic events and/or one or more non-periodic events. For example, the one or more periodic events may include one or more festivals, one or more sport events, one or more exam sessions, and/or the like. The one or more non-periodic events may include one or more musical events, one or more natural catastrophes, and/or the like. In an embodiment, the future event, such as a political event, may correspond to either a periodic event or a non-periodic event.

An "auto regressive moving average (ARMA) model" refers to a model that may perform a statistical analysis over a time series data to predict one or more future values of the time series. For example, given a time series data $X_t$, the ARMA model may be utilized to predict one or more future values in this series. The ARMA model consists of two portions i.e., an autoregressive portion and a moving average portion. Mathematically, the ARMA model may be written as:

$$X_t = c + \varepsilon_t + \sum_{i=1}^{p} \varphi_i X_{t-i} + \sum_{i=1}^{q} \theta_i \varepsilon_{t-i}$$

where,
p: corresponds to an order of the autoregressive portion;
q: corresponds to an order of the moving average portion;
$\varphi_r, \ldots, \varphi_p$: correspond to parameters of the autoregressive model;
$\theta_1, \ldots, \theta_q$: correspond to parameters of the moving average model;
c: correspond to a constant; and
$\beta_t$: correspond to a white noise.

In an embodiment, the parameters ($\varphi_1, \ldots, \varphi_p$ and $\theta_1, \ldots, \theta_q$) may be obtained or learned based on past time series data during model fitting.

An "auto regressive integrated moving average (ARIMA) model" is a generalization of an ARMA model. The ARIMA model is fitted to a time series data either to better understand the data or predict one or more future values of the time series. In an embodiment, the ARIMA model is utilized to forecast the time series data that takes into account trends, seasonality, cycles, errors, and non-stationary aspect of the data set. The ARIMA model does not provide any means to model any data that is representative of any external influence.

"Probability" shall be broadly construed, to include any calculation of probability; approximation of probability, using any type of input data, regardless of precision or lack of precision; any number, either calculated or predetermined, that simulates a probability; or any method step having an effect of using or finding some data having some relation to a probability.

A "probability distribution" refers to an assignment of probability to each measureable subset of possible outcomes of a random variable. In an embodiment, the probability distribution may correspond to a distribution of the random variable whose integral over any interval is the probability that the variate specified by it will lie within that interval.

A "classifier" refers to a mathematical model that categorizes data in one or more categories. In an embodiment, the classifier may be configured to predict one or more future activities of a user on a social media platform. In an embodiment, the classifier may be trained based at least the social media data to predict the future activities of the user. Examples of the classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier.

FIG. 1 is a block diagram of a system environment 100 in which various embodiments may be implemented. The system environment 100 includes a requestor-computing device 102, a user-computing device 104, a social media platform server 106, a database server 108, an application server 110, and a network 112. Various devices in the system environment 100 may be interconnected over the network 112. FIG. 1 shows, for simplicity, one requestor-computing device 102, two user-computing devices, such as a first user-computing device 104A and a second user-computing device 104B, one social media platform server 106, one database server 108, and one application server 110. However, it will be apparent to a person having ordinary skill in the art that the disclosed embodiments may also be implemented using multiple requestor-computing devices, multiple user-computing devices, multiple social media platform servers, multiple database servers, and multiple application servers without departing from the scope of the disclosure.

The requestor-computing device 102 refers to a computing device used by a requestor. The requestor may correspond to an individual, a sales person, or an artificial entity such as an organization or a franchise who may be interested to identify one or more future activities of a user on a social media platform. The one or more future activities may correspond to one or more actions/activities (e.g., sharing, posting, liking, disliking, etc.) that may be performed by the user on the social media platform.

In an embodiment, the requestor-computing device 102 may comprise one or more processors in communication with one or more memories. The requestor-computing device 102 may be operable to execute one or more sets of instructions stored in the one or more memories. In an embodiment, the requestor-computing device 102 may be communicatively coupled to the network 112. In an embodiment, the requestor-computing device 102 may comprise a display screen that may be configured to display one or more user interfaces to the requestor.

In an embodiment, the requestor may utilize the requestor-computing device 102 to transmit or receive information, pertaining to an identification of the one or more future activities of the user, to/from the database server 108 and/or the application server 110 over the network 112. For example, a requestor may input, using the requestor-computing device 102, a first numerical value representing a number of users, for whom the one or more future activities may be required to be predicted. In an embodiment, the requestor may input one or more historical activities of the user (or users) that may be required to be considered during the identification of the one or more future activities of the user (or the users). For example, based on the one or more historical activities performed by the user, the application server 110 may extract a first time series from the social media platform server 106. In an embodiment, the requestor may input one or more future events along with associated timestamps. Based on the one or more future events, the application server 110 may determine a second time series. In another embodiment, the requestor may input the second time series of the one or more future events.

Further, in an embodiment, the requestor may be presented with a user interface on the display screen of the requestor-computing device 102 displaying the predicted one or more future activities of the user. After identifying the one or more future activities of the user, the requestor may utilize the requestor-computing device 102 to communicate with the user over the network 112. Further, the requestor may recommend one or more products or services associated with the one or more future activities of the user.

The requestor-computing device 102 may correspond to various types of computing devices such as, but are not limited to, a desktop computer, a laptop, a PDA, a mobile device, a smartphone, a tablet computer (e.g., iPad® and Samsung Galaxy Tab®), and/or the like.

The user-computing device 104 refers to a computing device utilized by the user. The user may correspond to an individual who may be registered on one or more social media platforms. In an embodiment, the user-computing device 104 may comprise one or more processors in communication with one or more memories. The user-computing device 104 may be operable to execute one or more sets of instructions stored in the one or more memories. In an embodiment, the user-computing device 104 may be communicatively coupled to the network 112. In an embodiment, the user-computing device 104 may comprise a display screen that may be configured to display one or more user interfaces to the user.

In an embodiment, the user may utilize the user-computing device 104 to connect with the social media platform server 106, via the network 112. After connecting with the social media platforms (e.g., FACEBOOK, TWITTER™, and/or the like), the user may perform one or more activities on the social media platforms. For example, the one or more activities may include, but are not limited to, posting one or more messages. The one or more activities further include sharing, liking, or disliking one or more messages posted by one or more other users, and/or the like. The one or more messages may correspond to one or more text messages, one or more images, one or more tags, one or more videos, and/or the like.

Further, in an embodiment, the user may be presented with a user interface on the display screen of the user-computing device 104 displaying one or more recommendations for products or services. Further, the user may utilize the user-computing device 104 to provide one or more responses corresponding to the one or more recommendations.

The user-computing device 104 may correspond to various types of computing devices such as, but are not limited to, a desktop computer, a laptop, a PDA, a mobile device, a smartphone, a tablet computer (e.g., iPad® and Samsung Galaxy Tab®), and/or the like.

The social media platform server 106 may be configured to host one or more social network platforms such as, but are not limited to, one or more social media websites (e.g., FACEBOOK, TWITTER™, LINKEDIN, GOOGLE+™, and so forth), a chat/messaging application, a web-blog, web-forums, a community portal, an online community, or an online interest group. In an embodiment, the user may be registered on the one or more social network platforms. The social media platform server 106 may refer to a communication medium through which the user may interact with the one or more other users, who are also registered on the one or more social network platforms. Further, apart from interacting with one another, the user and the one or more other users may post the one or more messages on the social network platforms. Further, in an embodiment, the user may share/tag the one or more messages with the one or more other users on the social network platforms. Further, the user may interact with the one or more other users in reference to the one or more messages. In an embodiment, the one or more messages shared or posted by the user may be indicative of, but are not limited to, the one or more needs, likes, or dislikes of the user.

In an embodiment, the social media platform server 106 may be realized through various web-based technologies such as, but are not limited to, a Java web-framework, a .NET framework, a PHP framework, or any other web-application framework.

The database server 108 may refer to a computing device that may store social media data of each of the users, who are registered on the social media platforms such as FACEBOOK, LINKEDIN, TWITTER™, and/or the like, in accordance with at least one embodiment. The social media data pertaining to a user may comprise one or more of, but are not limited to, one or more attributes of a user profile associated with the user and the one or more historical activities performed by the user on the social media platforms. The one or more attributes pertaining to the user profile of the user may comprise at least one or more of, but are not limited to, a name, an occupational details, a biographical keywords, likes/dislikes, hobbies, and personal descriptions of the user. In an embodiment, the database server 108 may be configured to extract the social media data of each of the users from the social media platform server 106. The extraction of the social media data may be based on a first predefined time duration. For example, a requestor may specify to extract social media data of x users for a first predefined time period, such as last six months.

In an embodiment, the database server 108 may be communicatively coupled to the network 112. In an embodiment, the database server 108 may be configured to transmit or receive one or more instructions/information/social media data to/from one or more devices, such as the requestor-computing device 102, the social media platform server 106, and/or the application server 110 over the network 112. In an embodiment, the database server 108 may receive a query from the requestor-computing device 102 or the application server 110 to retrieve the social media data pertaining to each of the users. For querying the database server 108, one or more querying languages may be utilized such as, but not limited to, SQL, QUEL, DMX and so forth. Further, the database server 108 may be realized through various technologies such as, but not limited to, Microsoft® SQL server, Oracle, and My SQL.

A person having ordinary skill in the art will understand that the scope of the disclosure is not limited to the social media platform server 106 or the database server 108 as a separate entity. In an embodiment, the functionalities of the social media platform server 106 may be integrated into the database server 108, or vice-versa without departing from the spirit of the disclosure.

The application server 110 refers to a computing device that may include one or more processors and one or more memories. The one or more memories may include computer readable codes that may be executable by the one or more processors to perform one or more operations. For example, the one or more operations may include, but are not limited to, extracting the first time series of the one or more historical activities performed by the user from the social media platform server 106 and receiving the second time series from the requestor-computing device 102. The one or more operations may further include determining a first set of forecast values and a second set of forecast values using one or more forecasting techniques and further, predicting the one or more future activities of the user based on the first set of forecast values and the second set of forecast values.

Prior to performing the one or more operations, the application server 110 may receive the input from the requestor-computing device 102. For example, the application server 110 may receive the first numerical value. The first numerical value may represent the number of users for whom the application server 110 may have to predict the one or more future activities. In an embodiment, the application server 110 may further receive the one or more historical activities that may be required to be considered during the prediction of the one or more future activities of each user. Thereafter, the application server 110 may connect to the database server 108, over the network 112, to extract the social media data of the users, using one or more protocols such as, but not limited to, Open Database Connectivity (ODBC) protocol and Java Database Connectivity (JDBC) protocol. In an alternate embodiment, the application server 110 may directly extract the social media data from the social media platform server 106.

The application server 110 may be realized through various types of application servers such as, but not limited to, Java application server, .NET framework application server, and Base4 application server.

A person having ordinary skill in the art will understand that the scope of the disclosure is not limited to the database server 108 or the application server 110 as a separate entity. In an embodiment, the functionalities of the database server 108 may be integrated into the application server 110 without departing from the spirit of the disclosure.

Further, a person skilled in the art will appreciate that the scope of the disclosure should not be limited to the requestor-computing device 102 and the application server 110 as separate entities. In an embodiment, the application server 110 may be realized as an application hosted on or running on the requestor-computing device 102 without departing from the spirit of the disclosure.

The network 112 may include a medium through which devices, such as the requestor-computing device 102 and the user-computing device 104 and one or more servers, such as the social media platform server 106, the database server 108, and the application server 110 may communicate with each other. Examples of the network 112 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

Figure 2:
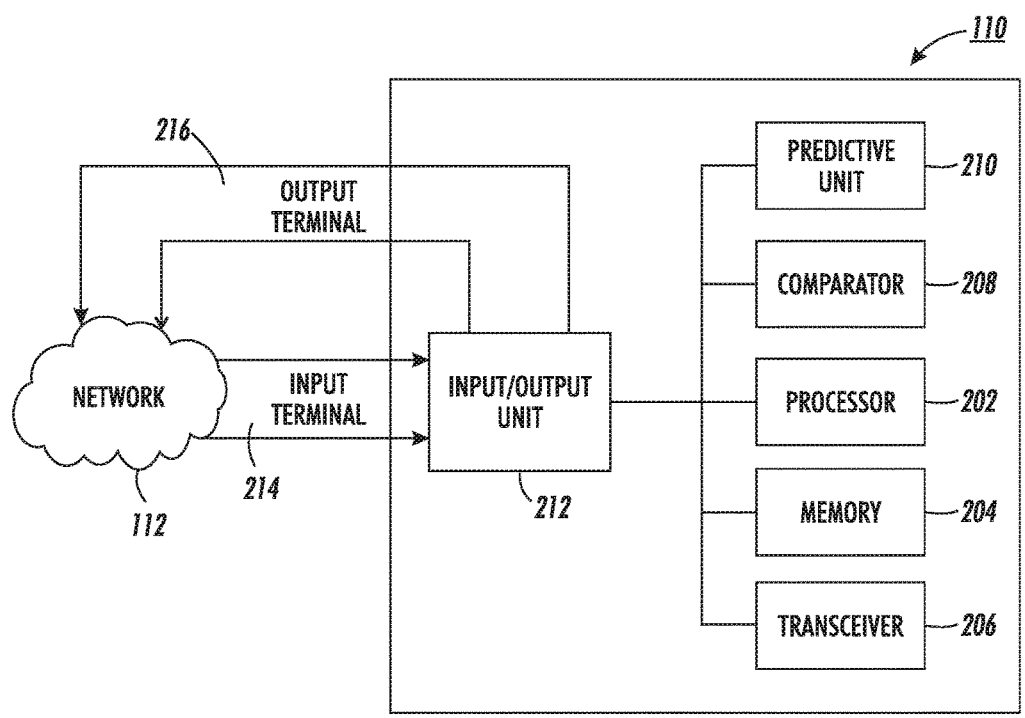
FIG. 2 is a block diagram that illustrates a system for predicting one or more future activities of a user on a social media platform, in accordance with at least one embodiment.

FIG. 2 is a block diagram that illustrates a system for predicting the one or more future activities of the user, in accordance with at least one embodiment. For the purpose of ongoing description, the system is considered as the application server 110. However, the scope of the disclosure should not be limited to the system as the application server 110. The system may also be realized as the requestor-computing device 102, without departing from the spirit of the disclosure.

The application server 110 may include one or more processors, such as a processor 202, one or more memories, such as a memory 204, one or more transceivers, such as a transceiver 206, one or more comparators, such as a comparator 208, one or more predictive units, such as a predictive unit 210, and one or more input/output units, such as a input/output (I/O) unit 212. The transceiver 206 may be coupled with the I/O unit 212. The I/O unit 212 may be connected to the network 112 through the input terminal 214 and the output terminal 216.

The processor 202 may comprise suitable logic, circuitry, interfaces, and/or codes that may be configured to execute one or more sets of instructions stored in the memory 204. The processor 202 may be coupled to the memory 204, the transceiver 206, the comparator 208, and the predictive unit 210. The processor 202 may further include an arithmetic logic unit (ALU) and a control unit. The ALU may be coupled to the control unit. The ALU may be configured to perform one or more mathematical and logical operations and the control unit may be operable to control the operation of the ALU. The processor 202 may execute the one or more sets of instructions, programs, codes, and/or scripts stored in the memory 204 to perform the one or more operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor, a microprocessor, a microcontroller, and/or the like.

The memory 204 may comprise suitable logic, circuitry, and/or interfaces that may be operable to store one or more machine codes, and/or computer programs having at least one code section executable by the processor 202 and/or the predictive unit 210. The memory 204 may further be configured to store the one or more sets of instructions, codes, and/or scripts. In an embodiment, the memory 204 may include one or more buffers (not shown). The one or more buffers may be configured to store at least one or more of, but are not limited to, the one or more attributes of the users (associated with the social media platform) and the information pertaining to the one or more historical activities performed by the users on the social media platform. The one or more historical activities may correspond to one or more actions/activities (e.g., sharing, posting, tagging, liking, or disliking a message) that may had been performed by the users in the past. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform the one or more operations. It will be apparent to a person having ordinary skill in the art that the one or more sets of instructions, programs, codes, and/or scripts stored in the memory 204 may enable the hardware of the system 200 to perform the one or more operations.

The transceiver 206 may comprise suitable logic, circuitry, and/or interfaces that may be operable to communicate with the one or more devices, such as the requestor-computing device 102 and the user-computing device 104 and/or one or more servers, such as the social media platform server 106 or the database server 108 over the network 112. The transceiver 206 may be operable to transmit or receive the instructions, queries, social media data, or other information to/from various components of the system environment 100. In an embodiment, the transceiver 206 may be coupled to the I/O unit 212 through which the transceiver 206 may receive or transmit the instructions, queries, social media data, and/or other information corresponding to the prediction of the one or more future activities of the user. In an embodiment, the transceiver 206 may receive and/or transmit various data in accordance with various communication protocols such as, TCP/IP, UDP, and 2G, 3G, or 4G communication protocols through the input terminal 214 and/or the output terminal 216, via the I/O unit 212.

The comparator 208 may comprise suitable logic, circuitry, and/or interfaces that may be configured to compare at least two input signals to generate an output signal. In an embodiment, the output signal may correspond to either "1" or "0." In an embodiment, the comparator 208 may generate an output "1" if a value of a first signal (from the at least two signals) is greater than a value of a second signal (from the at least two signals). Similarly, the comparator 208 may generate an output "0" if the value of the first signal is less than the value of the second signal. In an embodiment, the comparator 208 may be realized through either software technologies or hardware technologies known in the art. Though, the comparator 208 is depicted as independent from the processor 202 in FIG. 2, a person skilled in the art will appreciate that the comparator 208 may be implemented within the processor 202 without departing from the scope of the disclosure.

The predictive unit 210 may comprise suitable logic, circuitry, interfaces, and/or code that may be configured to execute one or more sets of instructions, codes, and programs stored in the memory 204. The predictive unit 210 may be realized by one or more statistical models and one or more learning algorithms, which may enable the prediction of the one or more future activities of the user. In an embodiment, the predictive unit 210 may employ one or more techniques such as, but are not limited to, one or more statistical techniques, one or more natural language processing techniques, one or more neural network techniques, and/or one or more machine learning techniques known in the art to predict the one or more future activities. The one or more machine learning techniques may be realized using one or more of, but are not limited to, Naïve Bayes classification, artificial neural networks, Support Vector Machines (SVM), multinomial logistic regression, or Gaussian Mixture Model (GMM) with Maximum Likelihood Estimation (MLE).

The I/O unit 212 may comprise suitable logic, circuitry, interfaces, and/or code that may be configured to transmit or receive the one or more messages and other information to/from the one or more devices, such as the requestor-computing device 102 and the user-computing device 104 and/or the one or more servers, such as the social media platform server 106 or the database server 108 over the network 112. The I/O unit 212 may also provide an output to the user. The I/O unit 212 may comprise various input and output devices that may be configured to communicate with the transceiver 206. The I/O unit 212 is connected with the network 112 through the input terminal 214 and the output terminal 216. In an embodiment, the input terminal 214 and the output terminal 216 may be realized through, but are not limited to, an antenna, an Ethernet port, an USB port or any other port that can be configured to receive and transmit data. Examples of the I/O unit 212 may include, but are not limited to, a keyboard, a mouse, a joystick, a touch screen, a touch pad, a microphone, a camera, a motion sensor, and/or a light sensor.

Figure 3:
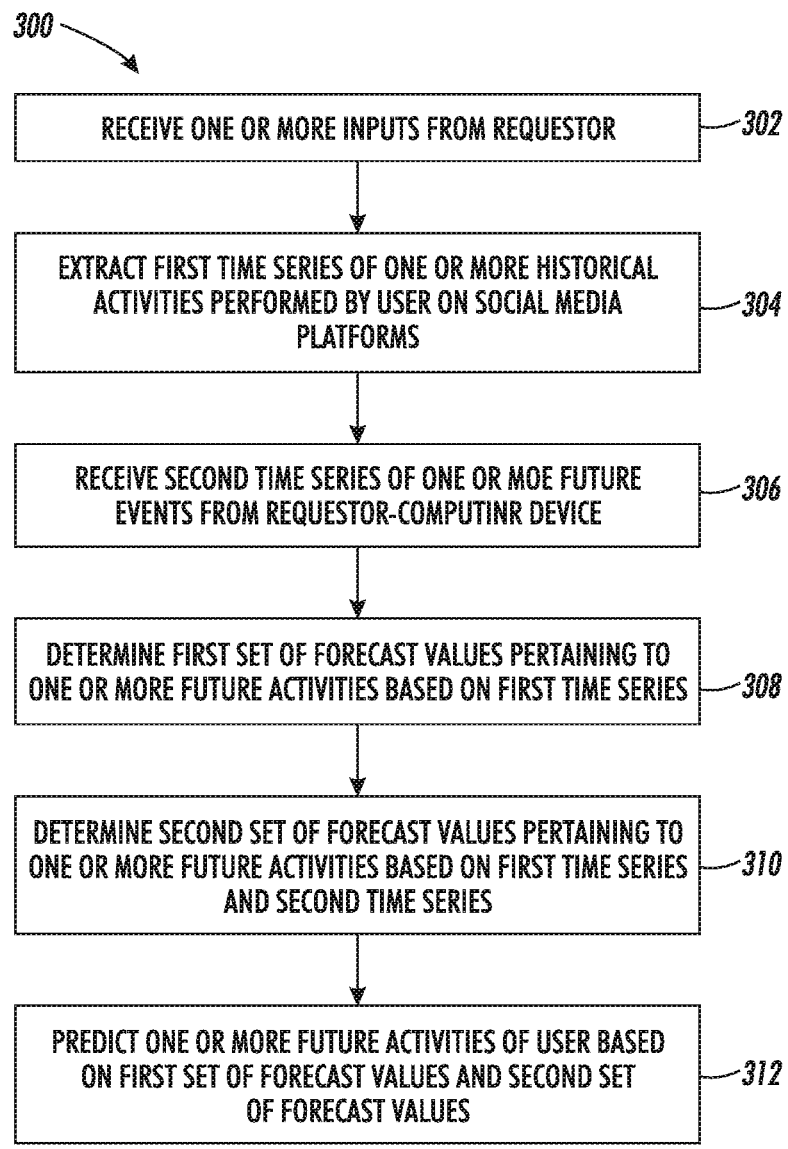
FIG. 3 is a flowchart that illustrates a method for predicting one or more future activities of a user on a social media platform, in accordance with at least one embodiment.

An embodiment of the operation of the system for predicting the one or more future activities of the user has been explained further in conjunction with FIG. 3.

FIG. 3 is a flowchart illustrating a method for predicting one or more future activities of a user, in accordance with at least one embodiment. The flowchart 300 has been described in conjunction with elements of FIG. 1 and FIG. 2.

At step 302, one or more inputs are received from the requestor. In an embodiment, the transceiver 206 may be configured to receive the one or more inputs from the requestor-computing device 102. The one or more inputs may have been provided by the requestor of the requestor-computing device 102. In an embodiment, a first input, from the one or more inputs, may be indicative of the first numerical value. The first numerical value may be representative of the number of users, for whom the predictive unit 210 may be required to predict the one or more future activities. For example, a requestor may specify to predict future activities of "10" users. In an alternate embodiment, the first numerical value may be representative of a minimum threshold and/or a maximum threshold associated with the number of users for whom the one or more future activities are to be predicted. For example, the requestor may specify to predict the future activities of at least "10" users. In another example, the requestor may specify to predict the future activities of at most "10" users. In yet another example, the requestor may specify to predict the future activities of "10±2" users, i.e., at least "8" users and at most "12" users. In an embodiment, a second input, from the one or more inputs, may be representative of the one or more historical activities of the user that may be required to be extracted to predict the one or more future activities. For example, the requestor may specify a historical activity as a count of tweets generated by a user. In such a scenario, the predictive unit 210 may predict a future activity of the user based on the count of tweets. In an embodiment, a third input, from the one or more inputs, may be representative of the one or more future activities that may be required to be predicted. For example, the requestor may specify to predict an interest of the user to buy cars in next month.

A person having ordinary skill in the art will understand that the scope of the disclosure is not limited to the second input and the third input as separate inputs. In an embodiment, the processor 202 may be configured to inherit the information associated with the third input based on the second input, or vice-versa. For example, the requestor specifies to analyze a count of tweets from a user in the last six months. In such a case, the requestor may be interested in knowing an expected count of tweets that will be generated by the user in the future (e.g., next one month). In another illustrative example, the requestor specifies to predict an interest of the user for buying cars in next month. In such a case, the processor 202 may extract the one or more historical activities, related to vehicles and specifically cars, performed by the user on the social media platform.

A person having ordinary skill in the art will appreciate that preferences, influences, needs, and all other characteristics of the user may vary with time. For example, needs of a user two years back may not be same as the current needs of the user. Therefore, it may not be significant to analyze the one or more historical activities of the user on the social media platform that are insignificant to the current needs of the user. For example, a set of messages that were posted and liked by a user "2 years" ago may not be of significance today. In order to avoid such irrelevant and ambiguous messages, the requestor may provide a fourth input. In an embodiment, the fourth input, from the one or more inputs, may be representative of a first predefined time duration and a second predefined time duration. The first predefined time duration may correspond to a time duration during which the user may have performed the one or more historical activities. For example, the requestor may specify to analyze the count of tweets made by a user during last "6 months". The second predefined time duration may correspond to a time duration during which the one or more future activities of the user is required to be predicted. For example, the requestor may specify to predict the expected count of tweets that will be made by the user in next "3 months".

A person having ordinary skill in the art will further appreciate that the preferences, influences, needs, and all other characteristics of the user may vary based on the one or more future events. For example, a political event or a musical event may influence the user that may result into an increase or decrease in the activities of the user on the social media platforms during the second predefined time duration. In order to include the significance of the one or more future events on the one or more future activities of the user, the requestor may provide a fifth input representing the one or more future events. Further, each of the one or more future events may be associated with a degree of significance. The degree of significance of a future event may be indicative of a level of impact that the future event may create on the user. In one embodiment, the requestor may provide the degree of significance of each of the one or more future events. In another embodiment, the processor 202 may determine the degree of significance based on at least a historical data extracted from the social media platform server 106. For example, "X" number of users are registered on a social media platform, such as FACEBOOK. Out of "X" number of users, "Y" number of users ("Y" is less than "X") have performed at least one activity, from one or more historical activities (e.g., post, share, like, dislike, and so on), during a festival such as Christmas in December 2014. The processor 202 may determine the degree of significance of the festival, i.e., the Christmas, by performing one or more operations (e.g., algebraic operations, statistical operations, logical operations, and/or the like) on the "X" and the After receiving the one or more inputs from the requestor-computing device 102, the processor 202 may store the one or more inputs in the memory 204. Based on the one or more inputs, the processor 202 may extract the social media data of the user (or the one or more users based on the first numerical value) from the social media platform server 106 or the database server 108. The processor 202 may store the extracted social media data of the user in the memory 204.

At step 304, the first time series of the one or more historical activities performed by the user on the social media platforms may be extracted. In an embodiment, the processor 202 may be configured to extract the first time series of the one or more historical activities performed by the user on the social media platforms. In an embodiment, the processor 202 may extract the first time series from the social media platform server 106. In an embodiment, the social media platform server 106 maintains a record of the one or more historical activities performed by the user on the social media platforms. In an embodiment, based on the one or more inputs provided by the requestor (as discussed in step 302), the processor 202 may transmit a query to the social media platform server 106 to obtain the first time series. Based on the query, the social media platform server 106 may generate the first time series. The first time series corresponds to a time series (univariate or multivariate) that represents a sequence of observations during the first predefined time duration. Each of the observations may correspond to a measurement (e.g., a count) of the one or more historical activities performed by the user during the first predefined time duration. In an embodiment, a mean and a variance of the measurement of the one or more historical activities are constant during the first predefined time duration. The first predefined time duration may include one or more first time durations. For example, a requestor wishes to determine an expected count of messages that will be tweeted by a first user in an upcoming month (e.g., August). Further, the requestor specifies to consider one or more messages that had been tweeted by the user during the last six months (i.e., February, March, April, May, June, and July). In such a case, the social media platform server 106 may generate the first time series based on a count of messages that were tweeted by the first user in each month of the last six months. For example, the first user posted "25" messages in February, "17" messages in March, "18" messages in April, "29" messages in May, "9" messages in June, and "11" messages in July. In such a case, the first time series may be given as:

first time series=[25, 17, 18, 29, 9, 11]

A person having ordinary skills in the art will appreciate that the scope of the disclosure is not limited to the first time series including numerical data pertaining to the one or more historical activities performed by the user, such as the count of tweets. In an embodiment, the first time series may further include categorical data pertaining to the one or more historical activities performed by the user. For example, the first user posted messages related to sports and music in January, movies in February, and politics, festivals, and sports in March. In such a case, the first time series may be given as:

first time series=[(sports, music), (movies), (politics, festivals, sports)]

In an embodiment, the processor 202 may apply a state of art topic identification technique, such as latent dirichlet allocation (LDA) to identify the topics (e.g., news, politics, sports, music, exam, and so on) of the one or more messages. Thereafter, the processor 202 may generate the first time series based on the one or more topics of the one or more messages published by the user. In another embodiment, the first time series may include observations (e.g., a count) pertaining to one or more topics (e.g., sports, music, politics, etc.) associated with the one or more messages distributed over the first predefined time duration. The first predefined time duration may include the one or more first time durations. For example, a first predefined time duration corresponds to "3 months" and the one or more first time durations in the first predefined time duration include "a first month", "a second month", and "a third month".

In another embodiment, the processor 202 may extract the first time series from the database server 108 or the memory 204. In another embodiment, the processor 202 may extract the social media data of the user from the social media platform server 106. The social media data may include the one or more attributes of the user and a log of the one or more historical activities performed by the user on the social media platforms during the first predefined time duration. Based on the extracted social media data, the processor 202 may generate the first time series.

At step 306, the second time series of the one or more future events is received. In an embodiment, the transceiver 206 may be configured to receive the second time series from the requestor-computing device 102. In another embodiment, the processor 202 may extract the second time series from the database server 108 or the memory 204. In an embodiment, the second time series corresponds to a temporal series (univariate or multivariate) of one or more future events during the second predefined time duration. In an embodiment, the processor 202 may determine a multivariate distribution over the topics associated with the one or more messages. In an embodiment, the multivariate distribution over the topics corresponds to the one or more future events. In an embodiment, following equation corresponds to the second time series:

E=[$M_1$, $M_2$, $M_3$, . . . , $M_e$, . . . , $M_n$]

where, $M_i$: refers to a multivariate distribution of one or more messages associated with each of the n events over k topics for a future event i, such that $M_i$=($p_{1,i}$, $p_{2,i}$, . . . , $p_{k,i}$) and $p_{1,i}+p_{2,i}+ \ldots +p_{k,i}=1$, where $p_{k,i}$ corresponds to a probability distribution of the one or more messages over k topics.

At step 308, the first set of forecast values pertaining to the one or more future activities of the user is determined. In an embodiment, the predictive unit 210 may be configured to determine the first set of forecast values pertaining to the one or more future activities. In an embodiment, the predictive unit 210 may determine the first set of forecast values based on the first time series. The predictive unit 210 may utilize the first forecasting technique to determine the first set of forecast values based on the first time series. The first forecasting technique may correspond to an auto regressive integrated moving average (ARIMA) technique. In an embodiment, the first set of forecast values corresponds to one or more future values of the first time series. The ARIMA technique may be realized by use of at least the following equations:

$$Y_t = (1-L)^d X_t \qquad (1)$$

$$(1-\Sigma_{i=1}^{p} \varphi_i L^i) Y_t = (1+\Sigma_{i=1}^{q} \theta_i L^i)\beta_t \qquad (2)$$

where,

L: corresponds to a Lag operator and $LX_t = X_{t-1}$;
d: corresponds to a degree of differencing;
p: corresponds to an order of the autoregressive (AR) part;
q: corresponds to an order of the moving average (MA) part;
$\varphi_1, \ldots, \varphi_p$: correspond to parameters of the AR model; and
$\theta_1, \ldots, \theta_q$: correspond to parameters of the MA model.

At step 310, the second set of forecast values pertaining to the one or more future activities is determined. In an embodiment, the predictive unit 210 may be configured to determine the second set of forecast values pertaining to the one or more future activities. In an embodiment, the predictive unit 210 may determine the second set of forecast values based on the first time series and the second time series. The predictive unit 210 may utilize a second forecasting technique to determine the second set of forecast values based on the first time series and the second time series. The second forecasting technique corresponds to a regression modelling technique. The regression technique may be realized by use of the following equation:

$$X_{t,i} = \beta_{0,i} + \beta_{1,i} P_{1,i} + e_i \qquad (3)$$

wherein, $X_{t,i}$: Predicted time series value;
$\beta_{0,i}, \beta_{1,i}$: Parameters learnt from the past time series data;
$P_{1,i}$: Probability of the message corresponding to a topic; and
$e_1$: Noise.

The regressors are learned from one or more historical activities performed by the user in the past and thereafter, predicts one or more second future values.

The one or more second future values may correspond to the second set of forecast values. In an embodiment, the predictive unit 210 may include a model based on the regression modelling technique to determine the second set of forecast values. In an embodiment, an ARIMA error may correspond to a mean absolute percentage error (MAPE) that is given by following equation:

$$MAPE = \frac{1}{n} \sum_{t=1}^{n} \frac{|X_t - F_t|}{X_t} \qquad (4)$$

where, $X_t$: corresponds to a first time series value;
n: corresponds to a count of data in the first time series; and
$F_t$: corresponds to a first set of forecast values.

At step 312, the one or more future activities of the user are predicted based on the first set of forecast values and the second set of forecast values. In an embodiment, the predictive unit 210 may be configured to predict the one or more future activities of the user. For example, the one or more future activities may include one or more of, but are not limited to, a frequency of visit of a user to a social media platform during a second predefined time duration, a count of messages to be posted, shared, or followed by the user during the second predefined time duration, and a like or a dislike of the user towards a product or a service during the second predefined time duration. In an embodiment, the one or more future activities of the user may be predicted based on an aggregation of the first set of forecast values and the second set of forecast values. In one embodiment, the aggregation may correspond to an average of the first set of forecast values and the second set of forecast values. In another embodiment, the aggregation may correspond to a weighted average of the first set of forecast values and the second set of forecast values. The predictive unit 210 may include an operational model (not shown) to perform the aggregation of the first set of forecast values and the second set of forecast values. The aggregation of the first set of forecast values and the second set of forecast values provides a final set of prediction values. The predictive unit 210 utilizes the final set of prediction values to predict the future activities of the user during the second predefined time duration. For example, a final set of prediction values corresponding to a count of messages that will be posted by a user on a social medial platform (FACEBOOK) in December-2015 (i.e. during Christmas and New year) is obtained on week basis as [35, 25, 50, 120, 150]. This implies that the user may post "35" messages in first week of December, "25" messages in second week of December, "50" messages in third week of December, "120" messages in second week of December, and "150" messages in second week of December.

After determining the one or more future activities that may be performed by the user during the second predefined time duration, the requestor may utilize the requestor-computing device 102 to recommend the one or more products or services to the user on various platforms such as social medial platforms. The recommendations of the one or more products or services may be based on the predicted one or more future activities of the user during the second predefined time duration.

Figure 4:
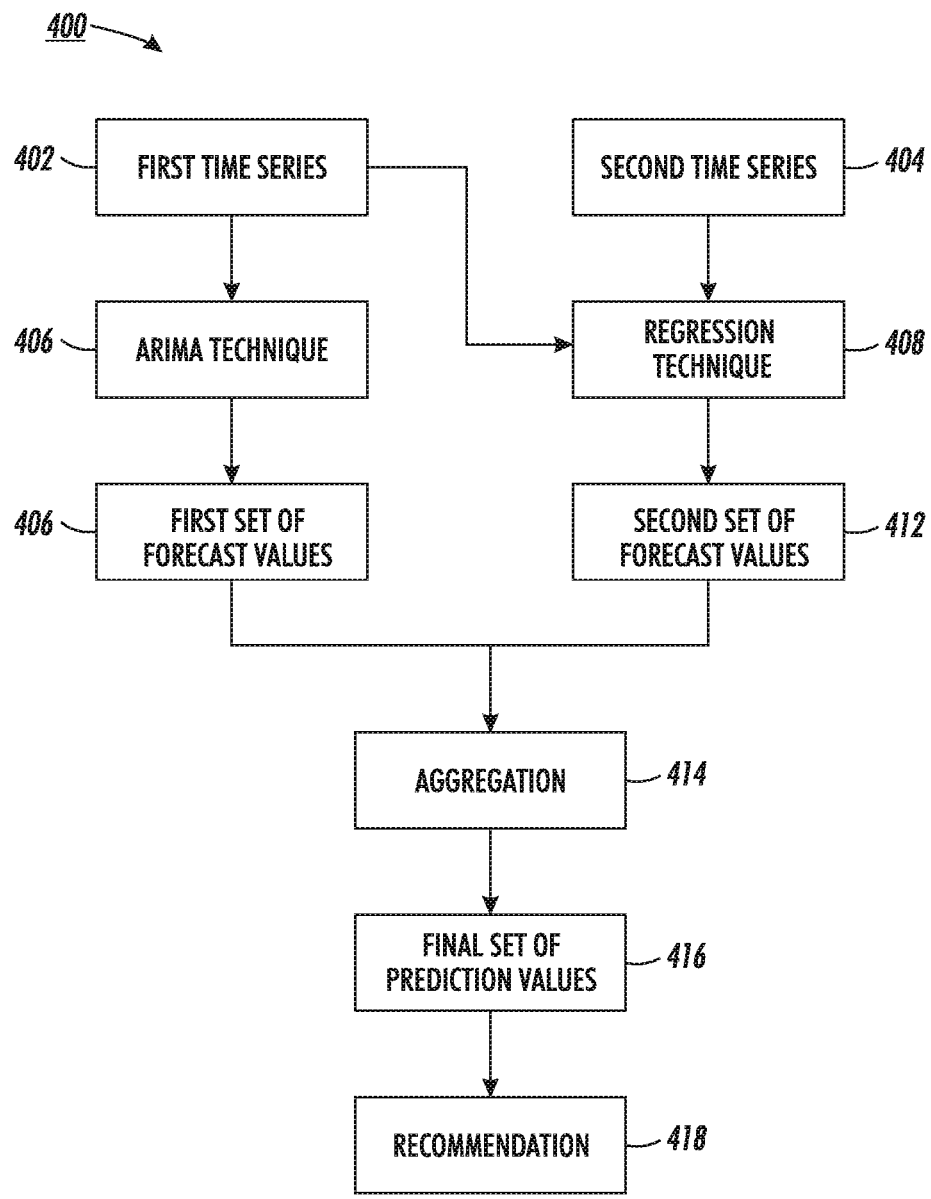
FIG. 4 is a flow diagram for predicting one or more future activities of a user on a social media platform, in accordance with at least one embodiment.

FIG. 4 is a flow diagram 400 that illustrates a prediction of the one or more future activities of a user, in accordance with at least one embodiment. The flow diagram 400 is described in conjunction with FIG. 1, FIG. 2 and FIG. 3.

The first time series (denoted by 402) is extracted from the social media platform server 106. The first time series may be representative of the one or more historical activities performed by the user per time period during the first predefined time duration. The per time period may be defined based on an hourly basis, a daily basis, a weekly basis, a monthly basis, a yearly basis, and/or the like. In an embodiment, the mean and the variance of the count of the one or more historical activities may be constant during the first predefined time duration. In an embodiment, based on the one or more inputs provided by the user, the processor 202 may extract the first time series from the social media platform server 106. Further, the processor 202 may receive the second time series (denoted by 404) from the requestor-computing device 102. The second time series may be representative of the one or more future events during the second predefined time duration. The one or more future events may comprise one or more periodic events and/or one or more non-periodic events. The one or more periodic events may comprise one or more of a festival, a sport event, an exam session, and/or the like. The one or more non-periodic events may comprise one or more of a musical event, an election campaign, a natural catastrophe, and/or the like.

In an embodiment, the predictive unit 210 utilizes an ARIMA model based on the ARIMA technique (denoted by 406) to obtain the first set of forecast values (denoted by 410). The predictive unit 210 further utilizes a regression model, based on the regression modelling technique (denoted by 408), to obtain the second set of forecast values (denoted by 412). The predictive unit 210 may further include an operation model. The operation model may be configured to perform operations, such as one or more mathematical operations, one or more logical operations, and/or one or more statistical operations on the first set of forecast values and the second set of forecast values to obtain a final set of prediction values. In one embodiment, the operation model may be configured to perform an aggregation (denoted by 414) of the first set of forecast values and the second set of forecast values to obtain the final set of prediction values (denoted by 416). The aggregation may correspond to the average or the weighted average of the first set of forecast values and the second set of forecast values.

After determining the one or more future activities of the user, the requestor may utilize the requestor-computing device 102 to connect with the user-computing device 104 over the network 112. Further, the requestor may transmit one or more recommendations for the one or more products or services (denoted by 418) associated with the one or more external events and/or the one or more future activities of the user. After receiving the one or more recommendations, the user may utilize the user-computing device 104 to take one or more actions (e.g., view, select, accept, reject, feedback, and/or the like) pertaining to the one or more recommendations.

The disclosed embodiments encompass numerous advantages. The disclosure provides a method and a system to predict one or more future activities of a user in a second predefined time duration (i.e., a future time duration). The disclosed methods and systems utilizes social media data (i.e., one or more historical activities performed by the user during a first predefined time duration) along with one or more future events associated with a second predefined time duration to predict one or more future activities of the one or more users. The prediction of the one or more future activities of the user may lead to an effective and personalized marketing and promotion of one or more products and services.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system.

The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for predicting future activities of a user on a social media platform have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for generating data structures for enhanced projection of user activities, the method comprising:
    extracting, by one or more processors of a computing device, data relating to activities performed by a user on a social media platform during a first time period from a social media platform server;
    receiving, by the one or more processors, input representing a future event affecting one or more future activities to be performed by the user during a second time period on the social media platform;
    determining, by the one or more processors, a degree of significance of the future event based on historical data representing historical activities performed by a plurality of users on the social media platform during a historical event associated with the future event;
    generating, by the one or more processors, a historical data structure comprising the data relating to activities performed by the user on the social media platform during the first time period;
    generating, by the one or more processors, a first future data structure comprising a first set of forecast values by applying a first forecasting technique to the historical data structure;
    generating, by the one or more processors, a second future data structure comprising a second set of forecast values by applying a second forecasting technique to the historical data structure, the future event, and the determined degree of significance, wherein the first and second forecasting techniques are not the same, and the first forecasting technique or the second forecasting technique uses a Naïve Bayes classifier, an artificial neural network, a support vector machine (SVM), or a Gaussian Mixture Model (GMM), or any combination thereof;
    aggregating, by the one or more processors, the first and second future data structures to generate an aggregated future data structure comprising aggregated forecast values, wherein the aggregation corresponds to an average or a weighted average of at least the first set of forecast values and the second set of forecast values; and
    projecting, by the one or more processors, based on the aggregated future data structure, the one or more future activities to be performed by the user during the second time period on the social media platform, wherein the second time period is associated with the future event affecting the one or more future activities to be performed during the second time period, and the one or more future activities to be performed during the second time period comprise:
 visiting the social media platform, quantitated by a frequency of visits of the user to the social media platform; and
 posting messages, sharing messages, following messages, or a combination thereof, quantitated by a count of each.

2. The method of claim 1, wherein the activities performed by the user during the first time period comprise one or more of one or both of:
 visiting the social media platform, quantitated by a frequency of visits of the user to the social media platform; and
 posting messages, sharing messages, following messages, or a combination thereof, quantitated by a count of each.

3. The method of claim 1, wherein:
 the data comprises at least a count of the activities performed by the user during the first time period; and
 a mean and a variance of the count are constant during the first time period.

4. The method of claim 1, further comprising recommending a target product, a target service, or both based on the projection of user activities to be performed.

5. The method of claim 1, wherein the future event occurs during the second time period.

6. The method of claim 1, wherein the future event comprises a periodic event.

7. The method of claim 1, wherein the future event comprises a non-periodic event.

8. A system for generating data structures for enhanced projection of user activities, the system comprising:
 one or more processors of a requestor-computing device configured to:
  extract data relating to activities performed by a user on a social media platform during a first time period from a social media platform server;
  receive input representing a future event affecting one or more future activities to be performed by the user during a second time period on the social media platform;
  determine a degree of significance of the future event based on historical data representing historical activities performed by a plurality of users on the social media platform during a historical event associated with the future event;
  generate a historical data structure comprising the data relating to activities performed by the user on the social media platform during the first time period;
  generate a first future data structure comprising a first set of forecast values by applying a first forecasting technique to the historical data structure;
  generate a second future data structure comprising a second set of forecast values by applying a second forecasting technique to the historical data structure, the future event, and the determined degree of significance, wherein the first and second forecasting techniques are not the same, and the first forecasting technique or the second forecasting technique uses a Naïve Bayes classifier, an artificial neural network, a support vector machine (SVM), or a Gaussian Mixture Model (GMM), or any combination thereof;
  aggregate the first and second future data structures to generate an aggregated future data structure comprising aggregated forecast values, wherein the aggregation corresponds to an average or a weighted average of at least the first set of forecast values and the second set of forecast values; and
  project, based on the aggregated future data structure, the one or more future activities to be performed by the user during the second time period on the social media platform, wherein the second time period is associated with the future event affecting the one or more future activities to be performed during the second time period, and the one or more future activities to be performed during the second time period comprise one or both of:
   visiting the social media platform, quantitated by a frequency of visits of the user to the social media platform; and
   posting messages, sharing messages, following messages, or a combination thereof, quantitated by a count of each.

9. The system of claim 8, wherein the activities performed by the user during the first time period comprise one or more of one or both of:
 visiting the social media platform, quantitated by a frequency of visits of the user to the social media platform; and
 posting messages, sharing messages, following messages, or a combination thereof, quantitated by a count of each.

10. The system of claim 8, wherein:
 the first forecasting technique or the second forecasting technique corresponds to an auto regressive integrated moving average (ARIMA) technique; or
 the first forecasting technique or the second forecasting technique is based on a regression modelling technique.

11. The system of claim 8, wherein the one or more processors are further configured to recommend a target product, a target service, or both based on the projection of user activities to be performed.

12. The system of claim 8, wherein the future event occurs during the second time period.

13. The system of claim 8, wherein the future event comprises a periodic event.

14. The system of claim 8, wherein the future event comprises a non-periodic event.

15. A computer program product for use with a computer, the computer program product comprising a non-transitory computer readable medium, wherein the non-transitory computer readable medium stores a computer program code for generating data structures for enhanced projection of user activities, wherein the computer program code is executable by one or more processors to:
 extract data relating to activities performed by a user on a social media platform during a first time period from a social media platform server;
 receive input representing a future event affecting one or more future activities to be performed by the user during a second time period on the social media platform;
 determine a degree of significance of the future event based on historical data representing historical activities performed by a plurality of users on the social media platform during a historical event associated with the future event;

generate a historical data structure comprising the data relating to activities performed by the user on the social media platform during the first time period;

generate a first future data structure comprising a first set of forecast values by applying a first forecasting technique to the historical data structure;

generate a second future data structure comprising a second set of forecast values by applying a second forecasting technique to the historical data structure, the future event, and the determined degree of significance, wherein the first and second forecasting techniques are not the same, and the first forecasting technique or the second forecasting technique uses a Naïve Bayes classifier, an artificial neural network, a support vector machine (SVM), or a Gaussian Mixture Model (GMM), or any combination thereof;

aggregate the first and second future data structures to generate an aggregated future data structure comprising aggregated forecast values, wherein the aggregation corresponds to an average or a weighted average of at least the first set of forecast values and the second set of forecast values; and project, based on the aggregated future data structure, the one or more future activities to be performed by the user during the second time period on the social media platform, wherein the second time period is associated with the future event affecting the one or more future activities to be performed during the second time period, and the one or more future activities to be performed during the second time period comprise:

visiting the social media platform, quantitated by a frequency of visits of the user to the social media platform; and posting messages, sharing messages, following messages, or a combination thereof, quantitated by a count of each.

16. The method of claim 1, wherein:

the first forecasting technique or the second forecasting technique corresponds to an auto regressive integrated moving average (ARIMA) technique; or the first forecasting technique or the second forecasting technique is based on a regression modelling technique.

17. The computer program product of claim 15, wherein:

the first forecasting technique or the second forecasting technique corresponds to an auto regressive integrated moving average (ARIMA) technique; or the first forecasting technique or the second forecasting technique is based on a regression modelling technique.

18. The computer program product of claim 15, wherein the computer program code is executable by one or more processors to further recommend a target product, a target service, or both based on the projection of user activities to be performed.

19. The computer program product of claim 15, wherein the future event occurs during the second time period.

20. The computer program product of claim 15, wherein the future event comprises a periodic event.

\* \* \* \* \*